United States Patent [19]

Yannich et al.

[11] Patent Number: 4,746,579

[45] Date of Patent: May 24, 1988

[54] ETHYLENE VINYL ACETATE COMPOSITIONS FOR DIELECTRIC SEALING APPLICATIONS

[75] Inventors: Marie E. Yannich, Cranbury; Howard G. Katz, Hightstown, both of N.J.

[73] Assignee: National Starch and Chemical Corporation, Bridgewater, N.J.

[21] Appl. No.: 46,761

[22] Filed: May 7, 1987

Related U.S. Application Data

[62] Division of Ser. No. 869,560, Jun. 2, 1986, Pat. No. 4,684,689.

[51] Int. Cl.$^4$ .............................................. B32B 27/30
[52] U.S. Cl. ............................ 428/522; 428/289; 524/115; 524/284; 524/295; 524/297; 524/366; 524/371; 524/376; 524/409; 524/437; 524/501
[58] Field of Search ............... 524/115, 284, 295, 297, 524/366, 371, 376, 409, 437, 501; 428/500, 522, 289

[56] References Cited

U.S. PATENT DOCUMENTS

| | | | |
|---|---|---|---|
| 3,380,851 | 4/1968 | Lindemann et al. | 117/140 |
| 3,705,053 | 12/1972 | Emmons et al. | 117/140 A |
| 3,776,810 | 12/1973 | Kelley | 161/170 |
| 3,933,691 | 1/1976 | Lindemann | 260/2.5 L |
| 3,935,151 | 1/1976 | Nickerson et al. | 524/501 |
| 4,002,801 | 1/1977 | Knechtges et al. | 428/474 |
| 4,042,553 | 8/1977 | Lindemann | 524/459 |
| 4,126,464 | 11/1978 | Dann | 428/522 |
| 4,332,850 | 6/1982 | Iacoviello | 523/344 |
| 4,478,972 | 10/1984 | Coorady | 524/428 |
| 4,481,250 | 11/1984 | Cook et al. | 428/290 |
| 4,590,102 | 5/1986 | Rosamilia et al. | 427/389 |
| 4,605,589 | 8/1986 | Orphanides | 524/563 |
| 4,610,920 | 9/1986 | Mudge et al. | 524/502 |

FOREIGN PATENT DOCUMENTS

0128454 12/1984 European Pat. Off. ............ 524/501

OTHER PUBLICATIONS

"Latex Backcoatings for Automotive Interior Trim"; William E. DeVry and Jack M. Quint; Journal of Coated Fabrics, vol. II (Jan. 1980) p. 143; 1982, Technomic Publishing Co., Inc.

"Use of Acrylic and PVC Latex in Nonwoven Applications"; William DeVry; Journal of Coated Fabrics; vol. 7, Oct. 1977; p. 97, Technomic Publishing Co., Inc.

*Primary Examiner*—Herbert J. Lilling
*Attorney, Agent, or Firm*—Ellen T. Dec; Edwin M. Szala

[57] ABSTRACT

A binder suitable for dielectric sealing may be prepared comprising a blend of a polyvinyl halide emulsion and an aqueous emulsion comprising a vinyl ester of an alkanoic acid interpolymerized with
 (a) 5 to 28% by weight of ethylene;
 (b) 0.5 to 4% by a weight of an N-methylol containing copolymerizable monomer;
 (c) 0 to 3% by weight of a latex stabilizer; and
 (d) 0 to 1% by weight of at least one polyunsaturated copolymerizable monomer,
the binder having a Tg of $-15°$ to $+35°$ C. and being buffered to a pH greater than 7.

9 Claims, No Drawings

ETHYLENE VINYL ACETATE COMPOSITIONS FOR DIELECTRIC SEALING APPLICATIONS

This application is a division of application Ser. No. 869,560, filed June 2, 1986, now U.S. Pat. No. 4,684,689.

BACKGROUND OF THE INVENTION

The present invention is directed to binders useful in the production of wadding such as is used in the manufacture of decorative, upholstered panels which are to be heat sealed to other substrates using dielectric bonding techniques. The binders of the invention have particular applicability in bonding panel boards to upholstered fabric in the construction of automotive door panels.

In a typical automotive door panel construction, a backcoated woven fabric or a vinyl coated knit is sealed to a nonwoven plumper fabric or wadding which has been spray bonded on each side with a latex binder. The other surface of the wadding is bonded to a rigid polymer coated fiberboard or paperboard sidewall door paneling in a rapid, one step dielectric sealing operation.

When vinyl coated fabrics are employed, the dielectric sealing process causes the vinyl fabric to become thermoplastic and contribute to the bonding of the pad; however, when polyester, nylon or rayon fabrics are employed, they lack this thermoplastic quality and place greater demands on the dielectic sealing properties of the binder composition.

The binders useful in these applications must therefore possess a variety of properties. The wet latex must be stable at the storage and application pH levels of 9 to 10 and all components of the binder composition must be compatible. The binder composition must adhere to a wide variety of surfaces at room temperature and under elevated temperatures; and must be able to withstand increasing voltage levels without arcing or burning during the dielectric sealing process.

Currently employed binders comprise combinations of polyvinyl chloride homopolymers and copolymers thereof with various vinyl or acrylate esters and/or plasticized polyvinyl chloride copolymers and homopolymers optionally blended with crosslinking and non-crosslinking acrylate ester copolymers. The use of higher amounts of the acrylate ester copolymers is becoming more common as the acrylic content provides better adhesion to the polyester, nylon and rayon fabrics which are rapidly replacing fabric backed vinyl.

It is in object of the present invention to provide a wadding binder composition capable of high adhesion and strength at ambient and elevated temperatures and suitable for use on synthetics and natural fabrics as well as vinyl coated fabrics.

SUMMARY OF THE INVENTION

We have now found that binders suitable for dielectric sealing may be prepared comprising a blend of a polyvinyl halide emulsion and an aqueous emulsion comprising a vinyl ester of an alkanoic acid interpolymerized with (a) 5 to 28% by weight of ethylene;
(b) 0.5 to 4% by weight of an N-methylol containing copolymerizable monomer;
(c) 0 to 3% by weight of a latex stabilizer; and
(d) 0 to 1% by weight of at least one polyunsaturated copolymerizable monomer, the binder composition having a Tg of −15 to +35° C. and being buffered to a pH greater than 7.

The polyvinyl halide component is generally polyvinyl chloride and includes polyvinyl chloride hompolymers, and copolymers thereof with up to 50% by weight of various vinyl or acrylate ($C_1$–$C_8$) esters; these polymers may optionally be plasticized and may be either crosslinking or non-crosslinking. Also useful herein are the corresponding vinylidene halides. Blends of any of these compositions are also useful herein. For convenience, this component will be referred to as the polyvinyl chloride of PVC component.

The binders optionally contain plasticizers, fire retardants and the like as are typically used in such dielectric sealing compositions.

The resultant binders are characterized by an excellent balance of toughness, strength, dielectric sealability and adhesion to a variety of surfaces and, as such, offer a product which is equivalent, and sometimes superior, to those acrylate systems conventionally employed while providing a substantial economic advantage thereover.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinly 2-ethyl-hexanoate, vinyl isoctanoate, vinyl nonoate, vinyl decanoate, vinyl pivalate, vinyl versatate, etc. Of the foregoing, vinyl acetate is the preferred monomer because of its ready availability and low cost.

The N-methylol component is generally N-methylol acrylamide or methacrylamide although other mono-olefinically unsaturated compounds containing an N-methylol group and capable of copolymerizing with ethylene and the vinyl ester may also be employed. It is necessary for the level of N-methylol component to be limited to 0.5 to 4.0%. At levels above about 4%, the EVA emulsion will not be compatible with the other mix components. At levels under about 0.5%, the crosslinking ability is not adequate for the binder to meet elevated temperature bond strength requirements.

Optionally, polyunsaturated copolymeriable monomers may also be present in small amounts, i.e., up to about 1% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, divinyl adipate, diallyl adipate; dilower alkenyl benzenedicarboxylates, for example, diallyl phthalate; lower alkanediol di-lower alkenoates, for example, ethylene glycol diacrylate, ethylene glycol dimethacrylate, butanediol dimethacrylate; lower alkylene bisacrylamides and lower alkylene bis-methacrylamides, for example, methylene bis-acrylamide; triallyl cyanurate, etc.

Additionally, low levels (i.e., 0.5 to 2% by weight) of carboxylated monomers may be included to improve adhesion to synthetic fibers provided their presence does not adversely affect the compatibility of the binder formulation.

Certain copolymerizable monomers which assist in the stability of the copolymer emulsion, e.g., vinyl sulfonic acid and 2-acrylamid-methypropac sulfonic acid may be used herein as latex stabilizers. These stabilizers are added in amounts up to about 3% by weight of the monomer mixture.

In accordance with the procedure utilized herein the vinyl acetate, ethylene and the N-methylol acrylamide are polymerized in an aqueous medium under pressures not exceeding 100 atmospheres in the presence of a catalyst and at least one emulsifying agent, the aqueous system being maintained, by a suitable buffering agent, at a pH of 2 to 7, the catalyst being added incrementally. The vinyl acetate is generally suspended in water and thoroughly agitated in the presence of ethylene under the working pressure to effect solution of the ethylene in the vinyl acetate up to the substantial limit of its solubility under the condition existing in the reaction zone, while the vinyl acetate is gradually heated to polymerization temperature. The homogenization period is followed by a polymerization period during which the catalyst, which consists of a main catalyst or initiator, and may include an activator, is added incrementally, and the N-methylol component is similarly added incrementally, the pressure in the system being maintained substantially constant by application of a constant ethylene pressure if required. Alternatively, some of the vinyl acetate may be charged initially, and the remainder pre-emulsified with the N-methylol component and added incrementally.

Suitable as polymerization catalysts are the water-soluble free-radical-formers generally used in emulsion polymerization, such as hydrogen peroxide, sodium persulfates, potassium persulfate and ammonium persulfate, as well as t-butyl hydroperoxide, in amounts of between 0.01 and 3% by weight, preferably 0.01 and 1% by weight based on the total amount of the emulsion. They can be used along or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The dispersing agents are all the emulsifiers generally used in emulsion polymerization, as well as optionally present protective colloids. The emulsifiers can be anionic or nonionic surface-active compounds. Preferably, both anionic and nonionic surfactants are employed. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Examples of suitable nonionic emulsifiers are the addition products of 5 to 50 mols of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof.

Preferably nonionic and/or anionic emulsifiers are used as emulsifying agents in amounts of 1 to 6% weight of the polymerisate. A proper balance of anionic and nonionic surfactants in the ethylene vinyl acetate polymerization is necessary to obtain optimum compatibility in the final binder formulation; however, because of the complexity of the various components employed, this proper balance is difficult to quantify. It will be recognized that various surfactants are employed in the preparation of the individual components as well as in the final formulation. For example, surfactants are used in the preparation of the polyvinyl chloride emulsion, as dispersants for the fire retardants and, often, as a post-addition in the formulation of the binder. Thus, if large amounts of surfactants are present in the other components of the binder, lower levels will be required in the N-methylol containing-ethylene vinyl acetate emulsion. In an optimum situation, sufficient surfactant levels are obtained in the individual components so that no post-addition of surfactant is required to stabilize the binder formulation.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkai metal phosphates. Polymerization regulators, like mercaptans, aldehydes, chloroform, methylene chloride and trichloroethylene, can also be added in some cases.

The reaction is generally continued until the residual vinyl acetate and N-methylol acrylamide content is below about 1%. The completed reaction product is then allowed to cool to about room temperature, while sealed from the atmosphere. The pH is then suitably adjusted to a value in the range of 4.5 to 7, preferably 5 to 6 to insure maximum stability.

By following the procedure described above, particularly the initial saturation of the polymerization mixture with ethylene before polymerization is initiated, there can be produced the stable vinyl acetate-ethylene-N-methylol acrylamide interpolymer latex characterized above, with the copolymer having an ethylene content of 10 to 30%, a glass transition temperature of between $-30$ and $+15°$ C., an intrinsic viscosity of 0.5 to 2.5 dl./g., and an average particle size of 0.1 to 2 u, and the latex having a high solids content of up to 60% or more. They are crosslinked in a weakly acid pH range or in the presence of an acid catalyst be elevated temperature. Suitable acid catalysts include mineral acids or organic acids, such as phosphoric acid, tartaric acid, citric acid, or acid salts, such as chromium-III salts, aluminum chloride, ammonium chloride, zinc nitrate or magnesium chloride, as known in the art.

Also useful in the binders of the present invention are blends of ethylene vinyl acetate copolymers with the N-methylol containing ethylene vinyl acetate polymers described above. Exemplary of such blends are those mixtures containing 50 to 95% of the ethylene vinyl acetate copolymer and 5 to 50% of the N-methylol containing polymer such as are described in U.S. Pat. No. 4,431,250 issued Nov. 6, 1984 to Cook et al.

The resultant N-methylol containing-ethylene-vinyl acetate interpolmer latex is combined with the polyvinyl halide component, most commonly polyvinyl chloride, in a dry solid ratio of 70/30 to 30/70. The polyvinyl halide component is preferably plasticized for example with phthalate esters such as dioctyl phthalate, phosphate esters, various polyester and polyether plasticizers and the like such as is known to those skilled in the art.

In order that the binder formulation be thermoplastic enough to flow and bond at the temperature induced by the dielectric field (typically 120° C. to 180° C., the blend should be prepared so as to have a Tg of between −15 and +35° C., preferably between +5 and +30° C. The desired Tg can be achieved in a number of ways as by varying the Tg of the components, that is, if one component has a Tg higher than the range, another component must be selected with a lower Tg. If, for example, 80% of the total binder is a hard PVC component, a softer EVA would be used than if 60% of a medium PVC component were used.

Tg Values for representative components are shown in the table below:

| Over +35° C. HARD COMPONENTS | −15° C. to +35° C. MEDIUM COMPONENTS | Under −15° C. SOFT COMPONENTS |
|---|---|---|
| Homopolymer PVC PVC copolymer with 5 to 15% vinyl ester ($C_1$ to $C_8$) Lightly plasticized PVC homopolymer or copolymer containing 5-15 parts per hundred plasticizer | Highly plasticized homopolymer PVC or PVC copolymer with 5-15% vinyl ester or acrylate ester ($C_1$ to $C_8$), highly plasticized (>15 pph) PVC copolymer with Tg of +35 to −15° C. NMA/EVA with Tg +15 to −15° C. | NMA/EVA with Tg under −15° C. |

The choice of the particular Tg is also related to the substrates to be sealed. Thus, where coated vinyl fabrics predominate, higher levels of PVC component may be used; where polyvester fabrics predominate, higher levels of EVA component may be used.

Since low levels of crosslinking are required for optimum aging and bond strength, before the binder is mixed with the vinyl chloride component, it is preferably mixed with a suitable buffer to a pH of 7 to 10. Both permanent and temporary buffers may be used. Permanent buffers are nonvolatile and do not evaporate or decompose with heat. Sodium or potassium hydroxide, strong organic bases, such as tetramethyl ammonium hydroxide and choline hydroxide are examples, but not meant to limit the useful list known to thos skilled in the art. Temporary buffers are, for example, ammonia or ammonium hydroxide, ammonium carbonate, volatile organic amines such as triethylamine and N,N-dimethyl ethanol amine. It is apparent that some buffers have both permanent and temporary nature, such as sodium carbonate.

The amount of buffering is critical to the maintenance of proper bonding and bond strength and will vary according to the amount of crosslinking potential present in the total binder system. For example, a highly buffered binder system using permanent buffer containing a low level of the N-methylol containing-ethylene vinyl acetate component will not cure adequately during drying of the pad, storage prior to use in automotive trim assembly, and heat created during the dielectric sealing process. The resultant bond will have poor resistance to heat, i.e., poor strength at 85° C., relative to the same system with less buffer used. At the other extreme would be a high level of ethylene vinyl acetate with a high level of the N-methylol crosslinking component and a low level of buffer, substantially all ammonia. During the drying of the spray bonded pad and under the influence of additional cure on storage and the heat put into the binder during the dielectric sealing, the binder system would become so thermoset in character, that the binder would not adequately heat seal to the fabric. This is particularly important on synthetic fiber fabrics where the binder on the padding contributes almost all of the bondability; while with vinyl fabrics, the vinyl fabric itself becomes thermoplastic and contributes to bonding with the pad.

The buffer may be incorporated into the binder in a variety of ways as long as the final pH of the binder, when appid to fiber wet, is at pH 7 or greater. For example, the polyvinyl halide component may be supplied at pH 8.5 to 10 and have sufficient buffer capacity to allow the final blend to be alkaline. If not, additional buffer may be added to the polyvinyl halide component prior to adding fire retardants or the ethylene vinyl acetate copolymer. It is also acceptable to add buffer to the ethylene vinyl acetate component and this can be particularly useful in preventing coagulation of the binder mix which sometimes occurs by the addition of low pH materials to those requiring high pH for emulsion stability. Adequate buffer might even be present from those used during the manufacture of the emulsion polymers, such that no buffer formulation is required when the wadding binder mix is made.

To promote compatibility with the vinyl halide systems prior to blending a surface active agent may also be added as discussed previously. Such surfactants may be anionic or nonionic in nature and may be added in amounts of 0.5 to 8% based on resin solids.

Additionally, in preparing the binder of the invention, fire retardants are generally required to provide the finished pad with a slow enough burn rate to satisfy the requirements of the automotive industry. All classes of fire retardants are useful for this purpose, but those with particular utility include antimony trioxide, aluminum trihydrate, decabromo-diphenyl oxide. Aside from a variety of halogen donors, nitrogen and phosphorous containing materials are known to work synergistically with the polyvinyl halide component and antimony. Inert fillers such as calcium carbonate, clays and the like are not very efficient fire retardants, but by virtue of their inflammability may be considered as such, particularly if large quantities are used. The fire retardants are generally used at levels of 5 to 20% by weight of the binder as is conventional in the art.

Preparation of the wadding may be accomplished in the following manner. Stock of unbonded nonwoven web is coated or impregnated with the binder formulation. Excess water is then removed through common methods such as tunnel driers. During the removal of water, temperature of the pad can be high enough to impart partial cure to the binder system.

A wide variety of nonwoven and textiel materials may be used as substrates herein, such as those derived from natural fibers, such as cotton, wool, silk, and the like; from artificial fibers, such as viscose rayon, acetate rayon, and other cellulose esters; from proteinaceous fibers such as those drived from casein; from synthetic fibers such as those derived from the condensation of adipic acid and hexamethylene diamine (nylon 66) or from the self-condensation of caprolactone (nylon 6); polyesters such as polyethylene terephthalate; olefins such as polyethylene and polypropylene; acrylic and modacrylic fibers from polymerized acrylonitrile or copolymers of acrylonitrile with one or more mono-olefinic monomers copolymerizable therewith, such as vinyl acetate, vinyl chloride, methyl acrylate, methyl methacrylate, and the like; from copolymers of vinyl chloride with vinyl acetate or vinylidene chloride; or the like. When impregnating or saturating the substrate, it may be dipped or sprayed and if the substrate is to be coated, it may be accomplished by dipping spraying or by employing a roller, spreading knife, brush, or the like.

Binder solids of 10 to 65% may be employed depending upon the polymer to filler ratio desired in the saturated product although the usual range is from about 15 to 50%. In general, pick-up in the range of 100 to 300%, preferably 150 to 200%, appears to be optimum; pick-up being defined as the dry weight of binder formulation (latexes+plasticizers+fillers, etc.) per 100 parts of fiber.

The following examples are given to illustrate the present invention, but it will be understood that they are intended to be illustrative only and not limitative of the invention. In the examples, all parts are by weight unless otherwise indicated.

The following test procedures were utilized in evaluating the binders prepared herein and are highly predicitive of the performance accomplished in commercial automotive trim assembly operation.

PREPARATION OF THE SEALED COMPOSITE

After conditioning, a composte sandwich is assembled where the upholstered fabric (wear surface side against the die) is layered with the padding followed by a backing panel which has previously been prepared with a vinyl coating and foam riser pads. This sandwich is dielectrically sealed under voltage conditions to provide betwen 120° and 180° C. but most often between 150° to 170° C. Strength of the bond between the fabric and wadding is measured using conventional peel tests. The following type bonds are evaulated.
A. Bonds After Ambient Conditioning—After the seals are made, the material is conditioned at 25° C. and 50% relative humidity and peel strength tests are run.
B. Bonds After Heat Aging—Prior to dielectric sealing, the wadding is subjected to heat of 110° to 135° F. for 5 minutes. After sealing, bond strength is evaluated. This test simulates aging of the wadding in a warehouse prior to commercial use and/or the undesirable excessive heat inadvertently given the pad during a commercial spray bonding procedure.
C. Bonds During Heating (Hot Bond Strength)—After the seals are made from pads pre-conditioned as in B, the sealed composite is placed in an 85° F. oven for 4 hours after which lifing of the fabric from the wadding is checked by observation or peel strength. This test simulates the ability of the stressed bond to withstand the heat experienced in repainting and/or a car being left in the sun on a hot day.
D. Arc Test—The unbonded sandwich composite is sealed in the dielectric press and monitored by sizzling sounds, sudden increases or decreases in the press meters at 2900 to 3000 volts and arcing and burn-through.
E. Compatibility with PVC—Prior to spraying the wadding, compatibility of the EVA with PVC is determined. The EVA is formulated according to specific end-use requirements (usually incorporating preplasticized PVC with fire retardans added, a surface active agent, buffering and water). The mix is evaluated for viscosity initially and over the course of 2 weeks using a Brookfield Viscometer at 50 rpm with a #1-190 2 spindle. An increase, for example, from 20 cps to 600 cps indicates incompatibility.

EXAMPLE I

A 10 liter stainless steel autoclave equipped with heating/cooling means, variable rate stirrer and means of metering monomers and initiators was employed. To the 10 liter autoclave was charged 900 g (of a 20% w/w/ solution) sodium alkyl aryl polyethylene oxide sulfate (3 moles ethylene oxide), 40 g (of a 70% w/w solution in water) alkyl aryl polyethylene oxide (30 mole ethylene oxide), 90 g (of a 25% w/w solution in water) sodium vinyl sulfonate, 2 g sodium formaldehyde sulfoxylate, 0.5 g sodium acetate, 5 g (of a 1% solution in water) ferrous sulfate solution and 2500 g water. After purging with nitrogen all the vinyl acetate (4000 g) was added and the reactor was pressurized to 600 psi with ethylene and equilibrated at 50° C. for 15 minutes.

The polymerization was started by metering in a solution of 25 g. tertiary butyl hydroperoxide in 250 g of water and 25 g sodium formaldeyde sulfoxylate in 250 g of water. The initiators were added at a uniform rate over a period of 5¼ hours.

Concurrently added with the initiators over a period of 4 hours was an aqueous solution of 245 g N-methylol acrylamide (48% w/w solution in water) in 500 g of water.

During the polymerization, the temperature was controlled at 55° C. to 60° C. by means of cooling. At the end of the reaction, the emulsion was transferred to an evacuated vessel (30 L) to remove residual ethylene from the system.

This procedure resulted in a polymer compound of ethylene, vinyl acetate, n-methylol acrylamide and acrylic acid (E/VA/NMA) is a 15:85:2.5 ratio. This emulsion was designated Emulsion 1.

Using the procedure similar to that descrbed above, a series of EVA emulsions having the following polymeric compositions were prepared.

TABLE I

| Emul- | Composition | | | | Surfactants | | Nonionic |
|---|---|---|---|---|---|---|---|
| | | | | | Anionic | | |
| sion | E | VA | NMA | AA | Parts | Type | Parts |
| 1A | 15 | 85 | 2.5 | 0 | 2.6 | Triton X301 | 3 |
| 1B | 15 | 85 | 2.5 | 0 | 2.6 | Triton X301 | 3 |
| 2A | 15 | 85 | 2.5 | 1 | 3.3 | Aerosol A103/A102 | 1 |
| 2B | 15 | 85 | 2.5 | 1 | 3.8 | Aerosol A103/A102 | 1 |
| 3 | 15 | 85 | 5.5 | 0 | 3.0 | Triton X301 | 1 |

E = ethylene
VA = vinyl acetate
NMA = N—methylol acrylamide
AA = acrylic acid
Aerosol A102 and A103 are ether sulfosuccinate surfactants.
Triton X-301 is sodium alkyl aryl polyethylene oxide sulfate.
The nonionic surfactant is Triton X305, an alkyl aryl polyether alcohol.

The emulsions described above were formulated into dielectric binder compositions by adding 2.2 parts of a nonionic surfactant dissolved in 41 parts water to 100 parts of the EVA emulsion, adjusting the pH to 9 and adding the resultant latex to 106 parts of a polyvinyl chloride emulsion to which fire retardant had been added. Total solids of the formulated binder was 45%.

The binders were then subjected to testing as described above. The results are shown in Table II.

TABLE II

| Emul-sion | Buffer | Viscosity (cps) | | | Results |
|---|---|---|---|---|---|
| | | Initial | 24 hrs. | 1 week | |
| 1A | NH$_4$OH | 40 | — | 30 | Passed all tests. |
| 1B | NaOH | <50 | <50 | <50 | Failed test "C". |
| 2A | NaOH | 75 | 140 | 110 | Passed all tests. |
| 2B | NaOH | 70 | 1750 | 4950 | Wasn't evaluated due to viscosity |
| 3 | NH$_4$OH | 40 | 400–500 | — | Wasn't evaluated due to viscosity |

The results presented above illustrate the criticality of the parameters of each of the components in the present invention.

Emulsions A and B illustrate the critical nature of the buffer systems used. Thus, the use in Emulsion 1A of ammonium hydroxide, a fugitive buffer, provided the adequate level of crosslinking in the system needed for hot bond strength. Emulsion 1B prepared with the permanent buffer, sodium hydroxide, retarded the crosslinking sufficiently to prevent development of hot bond strength. In contrast, sufficient crosslinking could be obtained by virtue of the presence of low levels of acrylic acid in Emulsion 2A that the use of the fugitive buffer was not desired.

Emulsions 2A and 2B illustrate the necessity for a critical balance of surfactants in order to obtain a commercially useful binder. Thus, while the bond strength provided by the binder of Emulsion 1B would be acceptable if used initially, under the storage conditions employed in these tests, the viscosity of the binder increased to a level where it could not be applied by spraying. In contrast, Emulsion 1A prepared in the same manner but utilizing a lower level of the same surfactant, did not exhibit a substantial increase in viscosity on storage and provided an excellent commercial product.

Emulsion 3 illustrates the undesirable increase in viscosity at N-methylol levels above about 4.

The results of the testing show that compatibility with vinyl halide, high bond strengths and arc resistance can be obtained with the N-methylol containing ethylene vinyl acetate emulsions in the invention. Thus, a balance of N-methylol containing copolymerizable monomer, appropriate types and levels of surface active agents and buffer yield a product which match the performance of current technology in the field and offer an economic advantage over the known currently used products.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A dielectrically-sealable article comprising a substrate coated or impregnated with an emulsion binder comprising a blend of a polyvinyl halide emulsion and an aqueous emulsion comprising a vinyl ester of an alkanoic acid interpolymerized with:
   (a) 5 to 28% by weight of ethylene;
   (b) 0.5 to 4% by a weight of an N-methylol containing copolymerizable monomer;
   (c) 0 to 3% by weight of a latex stabilizer; and
   (d) 0 to 1% by weight of at least one polyunsaturated copolymerizable monomer, the binder having a Tg of −15° to +35° C. and being buffered to a pH greater than 7.

2. The article of claim 1 wherein the polyvinyl halide and N-methylol-containing ethylene vinyl acetate monomer are present in a dry solids ratio of 70/30 to 30/70.

3. The article of claim 1 wherein the polyvinyl halide is polyvinyl chloride homopolymer or vinyl chloride copolymerized with up to 50% by weight of vinyl or acrylate (C$_1$-C$_8$) esters.

4. The article of claim 1 wherein the polyvinyl halide is plasticized.

5. The article of claim 4 wherein the polyvinyl halide is plasticized with a member selected from the group consisting of phthalate esters, phosphate esters, polyesters and polyethers.

6. The article of claim 1 additionally containing a fire retardant.

7. The article of claim 6 wherein the fire retardant is selected from the group consisting of antimony trioxide, aluminum trihydrate and decabromo-diphenyl oxide.

8. The article of claim 1 wherein the vinyl ester is vinyl acetate and the N-methylol containing comonomer is N-methylol acrylamide or N-methylol methacrylamide.

9. The article of claim 1 wherein the N-methylol-containing ethylene vinyl acetate copolymer emulsion is prepared in the presence of anionic and nonionic surfactant.

* * * * *